United States Patent
Watson

(10) Patent No.: US 11,290,258 B2
(45) Date of Patent: Mar. 29, 2022

(54) HYBRID CRYPTOGRAPHIC SYSTEM AND METHOD FOR ENCRYPTING DATA FOR COMMON FLEET OF VEHICLES

(71) Applicant: Panasonic Avionics Corporation, Lake Forest, CA (US)

(72) Inventor: Philip Watson, Lake Forest, CA (US)

(73) Assignee: PANASONIC AVIONICS CORPORATION, Lake Forest, CA (US)

(*) Notice: Subject to any disclaimer, the term of this patent is extended or adjusted under 35 U.S.C. 154(b) by 616 days.

(21) Appl. No.: 16/283,633

(22) Filed: Feb. 22, 2019

(65) Prior Publication Data

US 2020/0274699 A1 Aug. 27, 2020

(51) Int. Cl.
| | |
|---|---|
| H04L 29/06 | (2006.01) |
| H04L 9/08 | (2006.01) |
| G08G 1/00 | (2006.01) |
| H04W 4/46 | (2018.01) |
| H04L 9/32 | (2006.01) |

(52) U.S. Cl.
CPC ............ *H04L 9/0825* (2013.01); *G08G 1/22* (2013.01); *H04L 9/0822* (2013.01); *H04L 9/3249* (2013.01); *H04W 4/46* (2018.02)

(58) Field of Classification Search
CPC ... H04L 9/0825; H04L 9/0822; H04L 9/3249; H04L 63/045; H04L 2463/062; H04L 63/0435; H04L 9/3234; H04L 9/14; H04L 63/0428; H04L 9/0877; H04L 9/0897; H04W 4/46; G08G 1/22

See application file for complete search history.

(56) References Cited

U.S. PATENT DOCUMENTS

| | | | |
|---|---|---|---|
| 7,499,551 B1* | 3/2009 | Mire ...................... | H04L 9/006 380/277 |
| 7,877,602 B2 | 1/2011 | French et al. | |
| 9,602,509 B2 | 3/2017 | Johnson et al. | |
| 10,083,325 B2 | 9/2018 | Angus et al. | |
| 2010/0027788 A1* | 2/2010 | Tkacik ...................... | H04L 9/14 380/46 |
| 2015/0281189 A1* | 10/2015 | Nayshtut ............... | H04L 63/061 713/168 |

(Continued)

*Primary Examiner* — Yogesh Paliwal
(74) *Attorney, Agent, or Firm* — Perkins Coie LLP

(57) ABSTRACT

A hybrid encryption method for securely transferring an electronic data package from a sender to a plurality of clients. The method comprises storing a shared symmetric key on each of the clients. The sender encrypts a private key of an asymmetric key pair using the shared symmetric key. The sender encrypts the data package with a temporary symmetric key to generate an encrypted data package. The sender encrypts the temporary symmetric key with the public key of the asymmetric key pair to generate an encrypted temporary symmetric key. The sender transmits the encrypted data package, the encrypted temporary symmetric key, and the encrypted private key to the clients. Each client decrypts the encrypted data package by: using the shared symmetric key to decrypt the encrypted private key; using the decrypted private key to decrypt the encrypted temporary symmetric key, and using the decrypted temporary symmetric key to decrypt the encrypted data package.

20 Claims, 3 Drawing Sheets

(56) References Cited

U.S. PATENT DOCUMENTS

2016/0042157 A1\* 2/2016 Drope ................ H04N 21/6125
  713/165
2016/0261408 A1\* 9/2016 Peddada ............... H04L 9/0877
2017/0063810 A1\* 3/2017 Bruce ................... H04L 63/045

\* cited by examiner

HYBRID CRYPTOGRAPHIC SYSTEM AND METHOD FOR ENCRYPTING DATA FOR COMMON FLEET OF VEHICLES

BACKGROUND

The field of the invention generally relates to encryption of electronic data for securely distributing electronic data, and, more particularly, to a hybrid cryptographic system for encrypting a data package which efficiently and securely provides encryption, distribution, and decryption to a plurality of recipients.

In order to protect the contents of electronic data, methods of encryption have been developed such that only authorized parties can access the data, and unauthorized parties are prevented from accessing the data. In general, encryption of data entails encrypting the data using an encryption algorithm into an encrypted form such that the intelligible content of the data can only accessed by first decrypting the data. Encryption of data packages can be used to protect data at rest, i.e., as stored in a data storage device, or when it is in transit, such as being distributed or transmitted via a communication connection or network, such as private or public networks (e.g. the Internet, Ethernet, wireless networks, etc.), or any combination thereof.

Generally speaking, there are two types of encryption schemes, symmetric key and public key (also referred to as "asymmetric"). In a symmetric key scheme, the encryption and decryption keys are the same. In other words, the same symmetric key is used to both encrypt the data into an encrypted form and to decrypt the encrypted data into its original, usable form. Accordingly, communicating parties must have the same key in order to achieve secure transfer of the electronic data. In a symmetric key scheme, the symmetric key must be kept secret from unauthorized parties in order to maintain security of the electronic data.

In a public key encryption scheme, the encryption key is published for anyone to use and encrypt data. However, only the receiving party has access to the decryption key, commonly referred to as a "private key" that enables the data to be read in its decrypted form. In this way, a first party can broadly distribute the public key such that any third party can transmit encrypted data to the first party, but only the first party can decrypt the data.

Public key cryptosystems typically utilize complicated mathematical computations which make them much more inefficient than comparable symmetric key cryptosystems. Accordingly, a so-called hybrid cryptosystem has been developed which combines the convenience of a public key cryptosystem with the efficiency of the symmetric key cryptosystem. In a hybrid cryptosystem, both a symmetric key cryptosystem and a public key cryptosystem are utilized. The data is encrypted using the symmetric key, and the public key of the public key cryptosystem is used to encrypt the symmetric key. The data and encrypted symmetric key are then transferred to the recipient. The recipient uses its private key of the public key cryptosystem to decrypt the encrypted symmetric key, and then uses the symmetric key to decrypt the data. Thus, the more efficient symmetric key scheme is used to decrypt the data package, and the less efficient public key scheme is used only to decrypt the relatively short symmetric key.

The above-described hybrid cryptosystem tends to be adequate if the sender knows the public key of the desired recipient, but it comes with high operational overhead when the sender is delivering the same data package to many recipients. In this case, the sender must know the public key of very recipient, and then use the public key to asymmetrically encrypt the symmetric key with every recipient's key. A "key ring" is generated with all of the differently encrypted versions of the same symmetric key, and the key ring is transferred along with the encrypted data. Each recipient then decrypts its respective encrypted version of the symmetric key from the key ring, and uses the symmetric key to decrypt the data.

If the sender can first communicate with each recipient and have them first provide the sender with its public key, the problem of tracking which public key is at each destination is eliminated, and only one encrypted key needs to be sent. In other words, if there is a real-time communication connection between the sender and the recipient, the sender can obtain the public key of each respective recipient, use the public key to encrypt the symmetric key, and then send the encrypted data and respective encrypted symmetric key to each respective recipient. However, when the recipients are not certain to have live connectivity, the data package to be delivered must be prepared offline, and then transferred. In some situations, it is possible for the public key at each recipient to change since the last communication (e.g., this can happen during a repair/replace procedure of a recipient device), then keeping a record of the public key for each recipient becomes infeasible.

For example, this type of situation can occur with systems and components on a fleet of vehicles, such as aircraft, automobiles, buses, trains, ships. A sender may be sending a software update, entertainment media (e.g., movies, music, videos, etc.), or other data to electronic devices on a fleet of vehicles. As some examples, the devices may be an on-board entertainment system (e.g., an in-flight entertainment system "IFE", on an aircraft), an onboard computer, an onboard system or subsystem, wherein such systems and devices are referred herein as line replaceable units ("LRUs"). It is important to protect the data from being stolen, corrupted or modified while it is being transferred from the sender to the LRUs. Accordingly, the data is encrypted.

In a typical asymmetric encryption scheme, each of the LRUs has its own public key/private key of a key pair. The sender uses each LRU's respective public key to encrypt the data package, and transfers the respective encrypted data package to the respective LRU. Each LRU then uses its private key to decrypt the data package. However, LRUs within a fleet of vehicles may be replaced during repair and/or regular maintenance, such that the public key of an LRU on a particular vehicle may change upon replacement of the LRU. It can be seen that maintaining a record of the public key for each LRU becomes ever more difficult as the size of the fleet increases and/or the number of LRUs being replaced increases.

One solution to this problem of sending common data packages to multiple clients is simply to use a symmetric encryption scheme with a shared key, pre-installed on each client. The term "client" means any LRU or other device which receives data from the sender. In order to send a data package to the multiple clients, the sender encrypts the data package using the shared key, and transfers the encrypted data package to each client. Each of the clients then decrypts the encrypted data with the same shared key. However, this method has two problems: (a) if the shared, symmetric key is compromised, every client must be updated with a new, shared key, and (b) the shared, symmetric key is used frequently by the sender—every time a data package is encrypted for transfer to the clients—thereby making it more likely to be compromised.

Another solution is to use a shared asymmetric key pair, installing both in every client. The sender uses the public key to encrypt data to be transferred to each client, the encrypted data is transferred to each client, and each client uses the stored private key to decrypt the data. In addition, if encryption efficiency is an issue, the hybrid cryptosystem described above can be used to symmetrically encrypt the data with a symmetric key, and asymmetrically encrypt the symmetric key with the public key. This scheme solves problem (b) above, in that the private key is not used frequently by the sender. But it does not solve problem (a), because if the private key is compromised, every client must be updated with a new asymmetric key pair.

Accordingly, there is a need for an improved cryptographic methods and systems which increases the security of the shared encryption key to reduce the risk of the key being compromised needing replacement at each client, reduces the use of the shared encryption key thereby also reducing the risk of the shared encryption key being compromised, and also minimizes the need to maintain and/or utilize a record of the cryptographic keys installed on each client.

SUMMARY

The present invention is directed to an innovative hybrid cryptographic encryption method and system for securely transferring an electronic data package from a sender system ("sender") to a plurality of recipients such that each recipient can decrypt the data package. The method and system are particularly useful for efficiently and securely providing encryption, delivery, and decryption to a plurality of recipients. For example, the method and system may be used for a manufacturer/provider/servicer of vehicle on-board electronic systems to securely transfer electronic data packages to the on-board electronic systems after the systems have been installed on a fleet of vehicles. As an example, LRUs on a fleet of vehicles, such as aircraft, automobiles, buses, trains, ships, may require software to be uploaded from a source external to the vehicles, such as a software update, entertainment media (e.g., movies, music, videos, etc.), or other electronic data. As discussed herein, the LRUs may be any on-board entertainment system (e.g., an in-flight entertainment system "IFE", on an aircraft), an avionic system, navigational system, or other LRU.

In one embodiment, the hybrid encryption method for securely transferring a data package from a sender to a plurality of clients (also referred to as a "client device") comprises storing a shared symmetric key on a client trusted platform (TPM) of each client. As used herein, the term "client" means any electronic device having a computer processor, a storage device, and a communication system. For instance, LRUs are example of clients. As used herein, the term "sender" means any computer system having a processor, a storage device and a communication system. A "sender" may also include intermediary systems for transferring the encrypted data to the clients. A "trusted platform" or "trusted platform module" (sometimes referred to as a "cryptoprocessor") is a term generally known by those of ordinary skill in the art, and refers to a microprocessor configured and programmed to securely perform cryptographic functions, including generating and storing encryption keys, and encrypting and decrypting data.

The shared symmetric key will typically be randomly generated by the manufacturer of the client devices. The shared symmetric key is also referred to as a "Key Encrypting Key" or "KEK", because it is used to encrypt another encryption key, as described below. The manufacturer then transfers the shared symmetric key onto each of the client TPMs during manufacturing of each client device. The shared symmetric key is protected at a high security level, such as by security engineering. The high security level means that access is restricted to a trusted number of security personnel having a high trust level.

The sender (which may be the manufacturer of the client device) also stores the shared symmetric key on a sender TPM. The sender uses the shared symmetric key stored on the sender TPM to encrypt a private key of an asymmetric encryption key pair. The private key is a decryption key of an asymmetric encryption key pair formed by the private key and a public key. As can be seen below, once the private key is encrypted to generate an encrypted private key, the unencrypted private key is never needed again by the sender. In another aspect, security personnel having the high trust level generate the asymmetric key pair and encrypt the private key with the shared symmetric key. "Trusted personnel" means persons having authorized access to the shared symmetric key. They may also place the public key in a self-signed certificate.

The sender encrypts the data package with a temporary symmetric key to generate an encrypted data package. Restricted personnel may perform the process of encrypting the data package with the temporary symmetric key. Restricted personnel are persons having a lower level of trust than the security personnel, such as software configuration management personnel. "Restricted personnel" means persons who are restricted from access to the shared symmetric secret. The temporary symmetric key may be a randomly generated symmetric key generated by the restricted personnel.

The sender also encrypts the symmetric key with the public key to generate an encrypted temporary symmetric key. In another aspect, the restricted personnel may also perform the step of encrypting the temporary symmetric key with the public key.

The sender transfers the encrypted data package, the encrypted temporary symmetric key, and the encrypted private key (referred to collectively as the "encrypted payload package") to each of the clients. The sender can transfer the encrypted package by any suitable means, including a private network, a public network, the internet, a hardwired connection (e.g., USB), a wireless network, a cellular network, or any combination thereof. The sender can also transfer the encrypted package using any suitable combination of subsystem, such as transferring the encrypted package to a transfer unit(s) (e.g., a ground unit for aircraft), and then the transfer unit performs transferring to the client(s).

In another aspect, the encrypted package is transferred in a manner such that each client can decrypt the data package by: decrypting the encrypted private key using the shared symmetric key to generate a decrypted private key, the symmetric key stored on a trusted platform of the respective client; decrypting the temporary symmetric key using the decrypted private key to generate a decrypted temporary symmetric key; and decrypting the encrypted data package using the decrypted temporary symmetric key.

In still another aspect, the method may include each client decrypting the data package. Each client uses the common shared symmetric key stored on its client TPM to decrypt the encrypted private key using the shared symmetric key to generate a decrypted private key. Each client uses the decrypted private key to decrypt the temporary symmetric key generating a decrypted temporary symmetric key. Finally, each client uses the decrypted temporary symmetric key to decrypt the encrypted data package.

In still another aspect, the data package may comprise a software binary, text file, or other computer data file.

In yet another aspect, the asymmetric encryption key pair may be a Rivest-Shamir-Adleman (RSA) cryptosystem key pair, including without limitation, a 256-bit RSA cryptosystem key pair, or a 2048-bit RSA cryptosystem key pair.

In another aspect, the shared symmetric key and/or the temporary symmetric key may be an Advanced Encryption System (AES) cryptosystem key, including without limitation, a 256 bit AES encryption key.

Accordingly, a hybrid cryptographic encryption scheme which provides technical improvements over previous methods and systems. For one, this hybrid encryption scheme increases the security of the encryption key shared by both the sender and the clients, namely the shared symmetric key. The shared symmetric key is used only by trusted personnel of the sender, and it is used infrequently as it is only used by the sender to encrypt the private key.

The private key is also very secure because it is used only by trusted personnel of the sender, and it is also used infrequently as it is only used when it is encrypted by the shared symmetric key. Thereafter, only the encrypted private key is used in the encryption scheme.

The hybrid encryption scheme also eliminates the need to keep track of the cryptographic keys installed on each client because only a shared symmetric key is required to be known by each client and the sender. For the same reason, the scheme does not require providing a key ring having a symmetric key encrypted by a respective public key of each client, as was required in prior hybrid encryption schemes.

In addition, the hybrid encryption scheme also reduces the amount of secure storage required in every client over prior hybrid schemes because it only requires storing a shared symmetric key (e.g., 256 bits) as compared to a private key (e.g., 2048 bit key and a 4 KB certificate). When the key storage on each client is within hardware, such as a client TPM, reducing the key size reduces the cost of the hardware, and the savings is extended over the number of clients.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant (e.g., 120a is same or similar to 120b).

DETAILED DESCRIPTION

The present invention is directed to systems and methods for a hybrid encryption system for securely transferring an electronic data package from a sender system ("sender") to a plurality of client systems ("clients"). The embodiments described herein are directed to systems and methods for securely transferring a data package from a manufacturer of aircraft LRUs, such as avionics, in-flight entertainment systems, and the like, to the LRUs installed on a fleet of aircraft. However, it is understood that the systems and methods are not limited to these embodiments, and may be utilized in any suitable application for sending a data package from a sender to a plurality of clients. For instance, the systems and methods may be used to send a data package to a fleet of other types of vehicles, such as automobiles, buses, trains, and ships, or to simply distribute a data package from a sender to a plurality of computing devices, such as computers, smartphones, video game consoles, video players, etc. The data package may be any type of electronic data, including without limitation, application software, firmware, software or firmware updates, entertainment media (e.g., movies, music, videos, etc.), or other electronic data, or any combination thereof. The data package may be in any suitable electronic data form, including without limitation, a software binary, text, alphanumeric, compressed media, etc.

Figure 1:
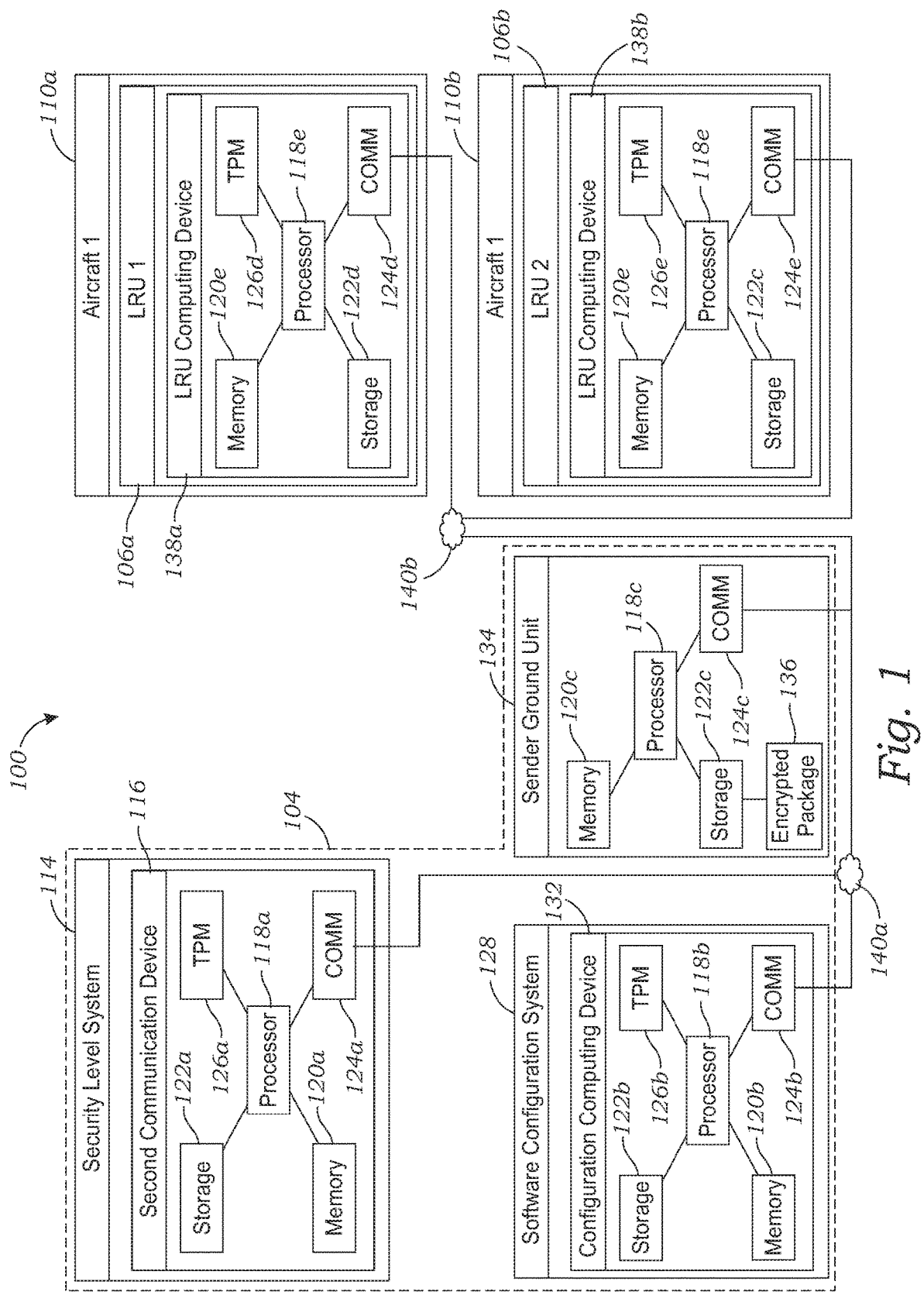
FIG. 1 illustrates a block diagram of a system for securely transferring a data package from a sender to an LRU on an aircraft, according to one embodiment of the present invention.

Referring to FIG. 1, a block diagram of one embodiment of an encrypted data distribution system 100 for securely distributing a data package 102 from a sender system 104 to a plurality of LRUs 106 (i.e., clients) is shown. The system 100 includes a sender system 108 and a plurality of aircraft 110 each having one or more LRUs 112 installed on the aircraft 110. The aircraft 110 may be for a common fleet, such as aircraft 110 operated by the same carrier or manufactured by the same aircraft manufacturer, or the aircraft 110 may from different carriers, and/or manufacturers, but include LRUs serviced by the same sender.

The sender system 108 includes a security level system 114 for generating and storing highly secure encryption keys, and encrypting a shared symmetric key (also referred to as a "key encryption key" ("KEK")). For example, the security level system 114 may be operated and controlled by a security engineering unit of the sender. The security level system 114 may have access restricted to only Trusted Personnel having a high trust level within the sender's organization and/or the number of Trusted Personnel may be limited to a trusted number of such personnel. The security level system 114 includes a secure computing device 116. The secure computing device 116 may be any suitable computing device, such as a computer, server computer, personal computer, etc. The secure computing device 116 has a processor 118a, memory 120a, a storage device 122a, a communication module 124a, and a sender TPM 126a. The communication module 124a may be any suitable electronic data communication module, such as a wired or wireless communication module, including without limitation, a USB module, an Ethernet network adapter, a Wi-Fi module, a Bluetooth module, a wireless USB module, etc.

The sender TPM 126 may be a separate microchip or integrated into another microchip, installed on a circuit board (e.g., the motherboard) of the secure computing device 116. The sender TPM 126 may comply with the TPM 2.0 standard, which specifies the following capabilities:

1. Advanced Encryption Standard (AES) encryption and decryption, including 256 bit AES;

2. Rivest-Shamir-Adelman (RSA) asymmetric public key encryption and decryption;

3. RSA signing (RSA digital signature and verification)

4. Hash functions, Secure Hash Algorithm SHA1, SHA2 (SHA256, etc.);

5. Hash-based message authentication code (HMAC) for message authentication; and 6. Elliptic-curve cryptography (ECC) operation.

The sender TPM 126 may also comply with Common Criteria EAL4+, as well.

The security level system 114 is configured to generate a shared symmetric key, the KEK, and protect the shared symmetric key from unauthorized disclosure. The security level system 114 is also configured to use the sender TPM 126a to generate a private key and public key asymmetric key pair. The security level system is further configured to encrypt the shared symmetric key using the private key to generate an encrypted shared symmetric key.

The security level system 114 is only accessible by Trusted Personnel.

The sender system 108 also has a software configuration system 128 for preparing the data package 102 for secure transfer to the LRUs 106. The software configuration system 128 may be operated by less trusted personnel than the security level system 114. Such less trusted personnel may be restricted from accessing the security level system 114, and thus, are referred to as "Restricted Personnel." The security level system 114 may be restricted from the Restricted Personnel by physically protecting the security level system 114 (e.g., a secured room), password protection, and/or multi-level authentication.

The software configuration system 128 includes a configuration computing device 132. The configuration computing device 132 has a processor 118b, memory 120b, a storage device 122b, a communication module 124b, and a second sender TPM 126b. The communication module 124b and second sender TPM 126b may be the same or similar to the communication module 124a and sender TPM 126a. The unencrypted data package 102 is stored in the storage device 122b of the configuration computing device 132.

The sender system 108 may also include a sender ground unit 134 which functions as an intermediary between the software configuration system 128 and the aircraft 110 for transferring an encrypted payload package 136 from the software configuration system 128 to the LRUs 106. The sender ground unit 134 has a processor 118c, memory 120c, a storage device 122c, and a communication module 124c. The sender ground unit 134 is configured to download the encrypted payload package 136 from the software configuration system 128, store the encrypted payload package 136 on the storage device 122c, and then upload the encrypted payload package 13 to the LRUs 106. The sender system 108 may include multiple sender ground units 134 in order to service large fleets of aircraft 110. As some examples, the sender ground unit 134 may be a portable hard drive, a portable computer, or other portable device which can be transported to the vicinity of the aircraft 110 to upload the encrypted payload package 136.

Still referring to FIG. 1, each aircraft 110 includes one or more LRUs 106 installed on the aircraft 110. Each LRU 106 comprises an LRU computing device 138. The LRU computing devices 138 each have a respective processor 118d, 118e, memory 120d, 120e, a storage device 122d, 120e, a communication module 124d, 124e, and an LRU TPM 126d, 126e. The LRUs 106 may be the same type of LRU or different types of LRU. Typically, for a given data package 102 being transferred to the LRUs 106, the LRUs will the same type. For instance, the sender may be updating the software on an avionics module, or updating the media on an in-flight entertainment system, and the sender is updating such LRU on the aircraft 110 for a fleet of aircraft 110.

The security level system 114, software configuration system 128, sender ground unit 135 and LRUs 106 may communicate using their respective communication modules 124 either directly with each other, or via one or more communication networks 140a, 140b. The communication networks 140a, 140b may comprise a proprietary network, LAN, WAN, cellular network, wireless network, the internet, combination of any of the foregoing, and/or other suitable network.

Figure 2:
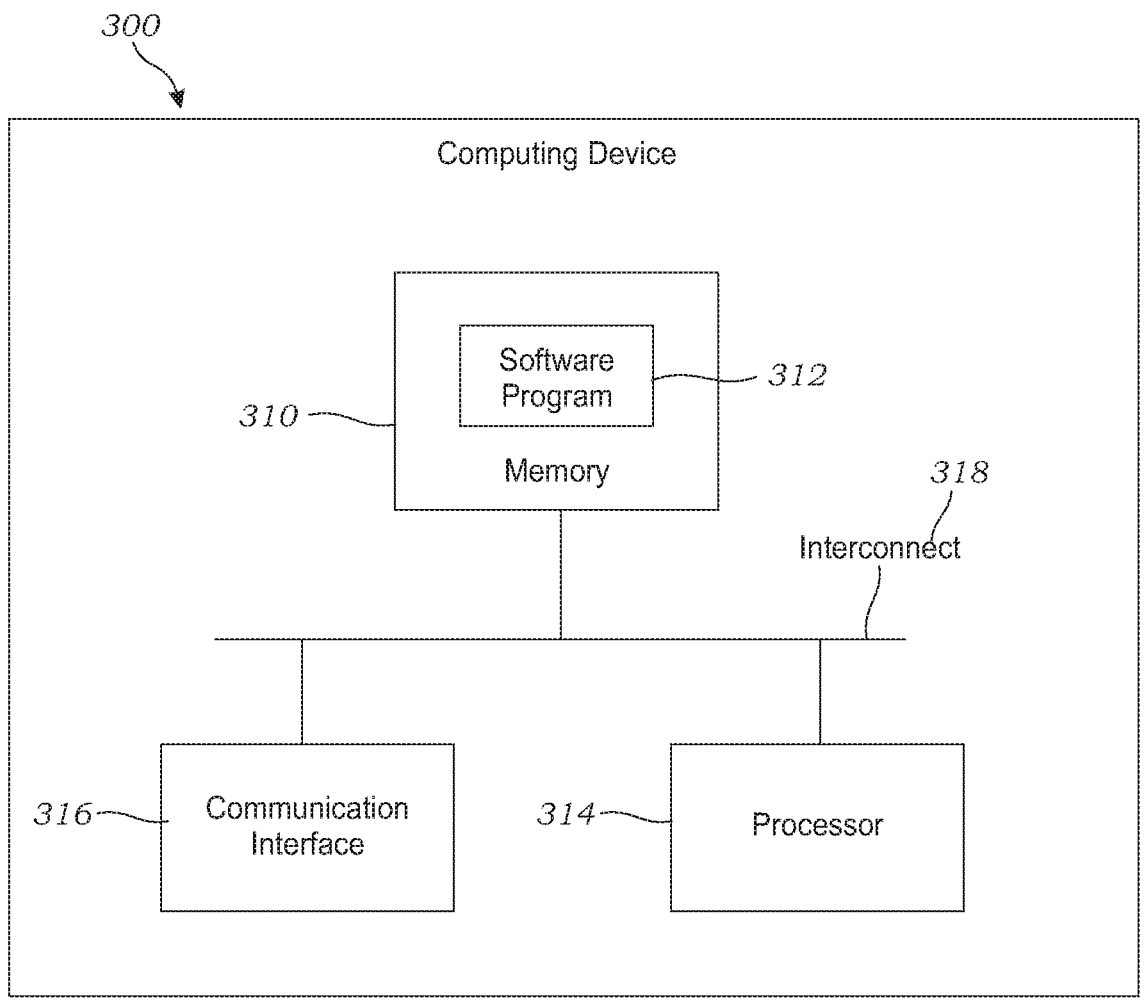
FIG. 2 is a schematic diagram of a computing device (computer) which may be utilized in the sender security system, the sender software management system, and/or the LRUs, according to one embodiment.

FIG. 2 generally shows a block diagram of the components of an example of a computer (computing device) 300 that may be used as the secure computing device 116, the configuration computing device 132, the sender ground unit 134 and/or the LRU computing device 106. The computing device 300 includes memory 310, an application software program 312, a processor or controller 314 to execute the application software 312, a network or communications interface 316, e.g., for communications with a network or interconnect 318 between the components. The memory 310 may be or include one or more of cache, RAM, ROM, SRAM, DRAM, RDRAM, EEPROM, SDRAM and other types of volatile or non-volatile memory capable of storing data. The processor unit 314 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 318 may include a system bus, LDT, PCI, ISA, or other types of buses, and the communications or network interface may, for example, be an Ethernet interface, a Frame Relay interface, or other interface. The network interface 316 may be configured to enable a system component to communicate with other system components across a network which may be a wireless network or various other communication networks, such as the communication networks 140. It should be noted that one or more components of computing device 300 may be located remotely and accessed via a network. Accordingly, the system configuration provided in FIG. 2 is provided to generally illustrate how embodiments may be configured and implemented.

Figure 3:
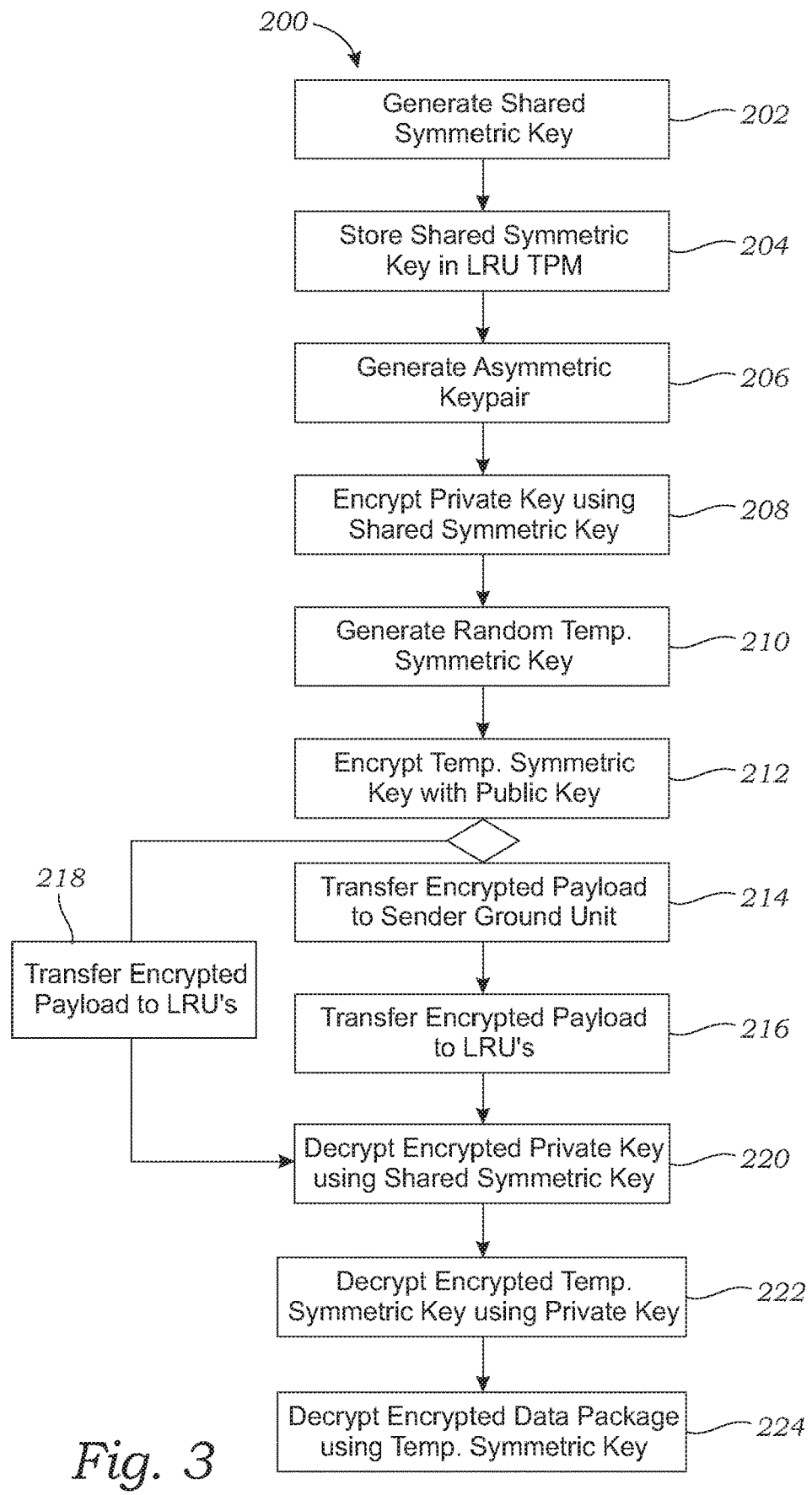
FIG. 3 illustrates an exemplary flow chart of a method for securely transferring a data package from a sender to a plurality of LRUs (clients), according to one embodiment of the present invention.

Turning to FIG. 3, a flowchart for one embodiment of a method 200 of using the encrypted data distribution system 100 to securely distribute a data package 102 from a sender system 104 to a plurality of LRUs 106 (i.e., clients) is shown. At step 202, the security level system 114 generates a shared symmetric key (KEK) using the client TPM 126a. The shared symmetric key may be an AES cryptosystem key, such as a 256-bit AES encryption key, or other suitable symmetric encryption key.

At step 204, the sender securely stores the shared symmetric key in the LRU TPM 126d, 126e of each of the LRUs 106. This step 204 is typically done during the manufacturing of the LRUs 106, such as during loading the software and firmware into the LRU 106 and/or the LRU computing device 138. Step 204 may also be done if there is a need to change the shared symmetric key, such as if the shared symmetric key is compromised.

At step 206, the security level system 114 generates a private key and public key asymmetric key pair using the sender TPM 126a. The asymmetric key pair may be an RSA cryptosystem key pair, such as a 256-bit RSA key pair, a 2048-bit RSA key pair, or other suitable asymmetric key pair. The public key is placed in a self-signed certificate.

At step 208, the security level system 114 uses the sender TPM 126a to encrypt the private key using the shared symmetric key thereby generating an encrypted shared symmetric key. At step 210, the security level system 114 provides the encrypted shared symmetric key to the software configuration system 128. The encrypted shared symmetric key may be provided using the communication modules 124a, 124b. The steps 202-210 are performed by the Trusted Personnel using the security level system 114.

At step 210, the software configuration system 128 generates a random, temporary symmetric key using the second sender TPM 126b. The temporary symmetric key may be an AES cryptosystem key, such as a 256-bit AES encryption key, or other suitable symmetric encryption key. The software configuration system 128 encrypts the data package 102 with the temporary symmetric key using the second send TPM 126b thereby generating an encrypted data package. At step 212, the software configuration system 128 encrypts the temporary symmetric key with the public key of the asymmetric key pair generated by the sender TPM 126a, thereby generating an encrypted temporary symmetric key. At step 214, the encrypted data package, the encrypted temporary symmetric key, and the encrypted private key (collectively, the encrypted payload package 136) are transferred from the software configuration system 128 to the sender ground unit 134. The encrypted payload package 136 is stored in the storage device 122c of the sender ground unit. At step 216, the sender ground unit 134 transfers the encrypted payload package 136 to each of the LRUs 106a, 106b. The LRUs store the encrypted payload package 136 in the storage devices 122d, 122e.

Alternatively, at step 218, the encrypted payload package 136 may be transferred from the software configuration system 128 to the LRUs 106, using the communication modules 124b and 124d, 124e, via a communication network 140, without using the sender ground unit 134. It is understood that the encrypted payload package 136 may be transferred to some LRUs 106 using the sender ground unit 134 and to other LRUs directly from the software configuration system 128.

Accordingly, steps 202-218 comprise a method of securely transferring the encrypted payload package 136, including the encrypted data package to each of the LRUs 106. The method 200 may also include each LRU 106 decrypting the encrypted data package so that the LRU can utilize the decrypted data package. At step 220, the LRU 106 decrypts the encrypted private key with the shared symmetric key using the LRU TPM 127, thereby generating a decrypted private key. At step 222, the LRU 106 then decrypts the encrypted temporary symmetric key using the decrypted private key using the LRU TPM 127, thereby generating a decrypted temporary symmetric key. At step 224, the LRU TPM 127 decrypts the encrypted data package with the decrypted temporary symmetric key using the LRU TPM 127.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:

1. A hybrid encryption method for securely transferring a data package from a sender to a plurality of clients, the method comprising:
   storing a shared symmetric key on a client trusted platform (TPM) of each client;
   the sender encrypting a private key using the shared symmetric key stored on a sender trusted platform, the private key being a decryption key of an asymmetric encryption key pair comprising the private key and a public key;
   the sender encrypting the data package with a temporary symmetric key to generate an encrypted data package;
   the sender encrypting the temporary symmetric key with the public key to generate an encrypted temporary symmetric key; and
   the sender transferring the encrypted data package, the encrypted temporary symmetric key, and the encrypted private key to each of the clients.

2. The method of claim 1, wherein the sender stores the private key on a sender trusted platform ("sender TPM") accessible to only trusted personnel and the private key is not accessible to less trusted personnel who encrypt the data package with the temporary symmetric key to generate an encrypted data package.

3. The method of claim 2, wherein the sender TPM is protected by a hardware security module.

4. The method of claim 1, wherein the data package comprises a software binary.

5. The method of claim 1, wherein the asymmetric encryption key pair is a Rivest-Shamir-Adleman (RSA) cryptosystem key pair at least 256 bits in length.

6. The method of claim 1, wherein the shared symmetric key is an AES cryptosystem key.

7. The method of claim 1, wherein the temporary symmetric key is an AES cryptosystem key.

8. The method of claim 1, further comprising, storing the shared symmetric key on a trusted platform of each client.

9. The method of claim 1, further comprising:
   each client performing the following process to decrypt the data package:
      decrypting the encrypted private key using the shared symmetric key to generate a decrypted private key, the symmetric key stored on a trusted platform of the respective client;
      decrypting the encrypted temporary symmetric key using the decrypted private key to generate a decrypted temporary symmetric key; and
      decrypting the encrypted data package using the decrypted temporary symmetric key.

10. A hybrid encryption method for securely transferring a data package from a sender to a plurality of clients, the method comprising:
   generating a shared symmetric key and storing the shared symmetric key on each client;
   the sender encrypting a private key using said shared symmetric key stored on a client trusted platform, the private key being a decryption key of an asymmetric encryption key pair comprising the private key and a public key;
   the sender encrypting the data package with a temporary symmetric key to generate an encrypted data package;
   the sender encrypting the symmetric key with the public key to generate an encrypted temporary symmetric key;
   transmitting the encrypted data package, the encrypted temporary symmetric key, and the encrypted private key to each of the clients in a manner such that each of the clients can decrypt the data package by:

decrypting the private key using the shared symmetric key to generate a decrypted private key;

decrypting the temporary symmetric key using the decrypted private key to generate a decrypted temporary symmetric key; and decrypting the encrypted data package using the decrypted temporary symmetric key.

11. The method of claim 10, wherein the sender stores the private key on a sender trusted platform (sender TPM) accessible to limited trusted personnel and the private key is not accessible to less trusted personnel who encrypt the data package with the temporary symmetric key to generate an encrypted data package.

12. The method of claim 11, wherein the sender TPM is protected by a hardware security module.

13. The method of claim 10, wherein the asymmetric encryption key pair is a Rivest-Shamir-Adleman (RSA) cryptosystem key pair selected from the group consisting of a 256-bit RSA cryptosystem key pair and a 2048-bit RSA cryptosystem key pair.

14. The method of claim 10, wherein the shared symmetric key is an AES cryptosystem key.

15. The method of claim 10, wherein the temporary symmetric key is an AES cryptosystem key.

16. The method of claim 10, further comprising, storing the shared symmetric key on a trusted platform of each client.

17. A hybrid encryption method for securely transferring a data package from a sender to a plurality of line replaceable units (LRUs) each installed on a vehicle, the method comprising:

storing a shared symmetric key on a trusted platform of each LRU;

the sender generating an asymmetric encryption key pair comprising a private key and a public key;

encrypting the private key using said shared symmetric key;

encrypting the data package with a temporary symmetric key to generate an encrypted data package;

encrypting the temporary symmetric key with the public key to generate an encrypted temporary symmetric key;

transmitting the encrypted data package, the encrypted temporary symmetric key, and the encrypted private key to each of the LRUs, the encrypted data package, the encrypted temporary symmetric key, and the encrypted private key being configured to allow each LRU to decrypt the data package by:

decrypting the encrypted private key using the shared symmetric key to generate a decrypted private key;

decrypting the encrypted temporary symmetric key using the decrypted private key to generate a decrypted temporary symmetric key; and decrypting the encrypted data package using the decrypted temporary symmetric key.

18. The method of claim 17, wherein the sender stores the private key on a sender trusted platform (sender TPM) accessible to only limited trusted personnel and the private key is not accessible to less trusted personnel who encrypt the data package with the temporary symmetric key to generate an encrypted data package.

19. The method of claim 18, wherein the sender TPM is protected by a hardware security module.

20. The method of claim 17, wherein the LRUs are installed on respective aircraft of a fleet of aircraft.

* * * * *